Figure 1:
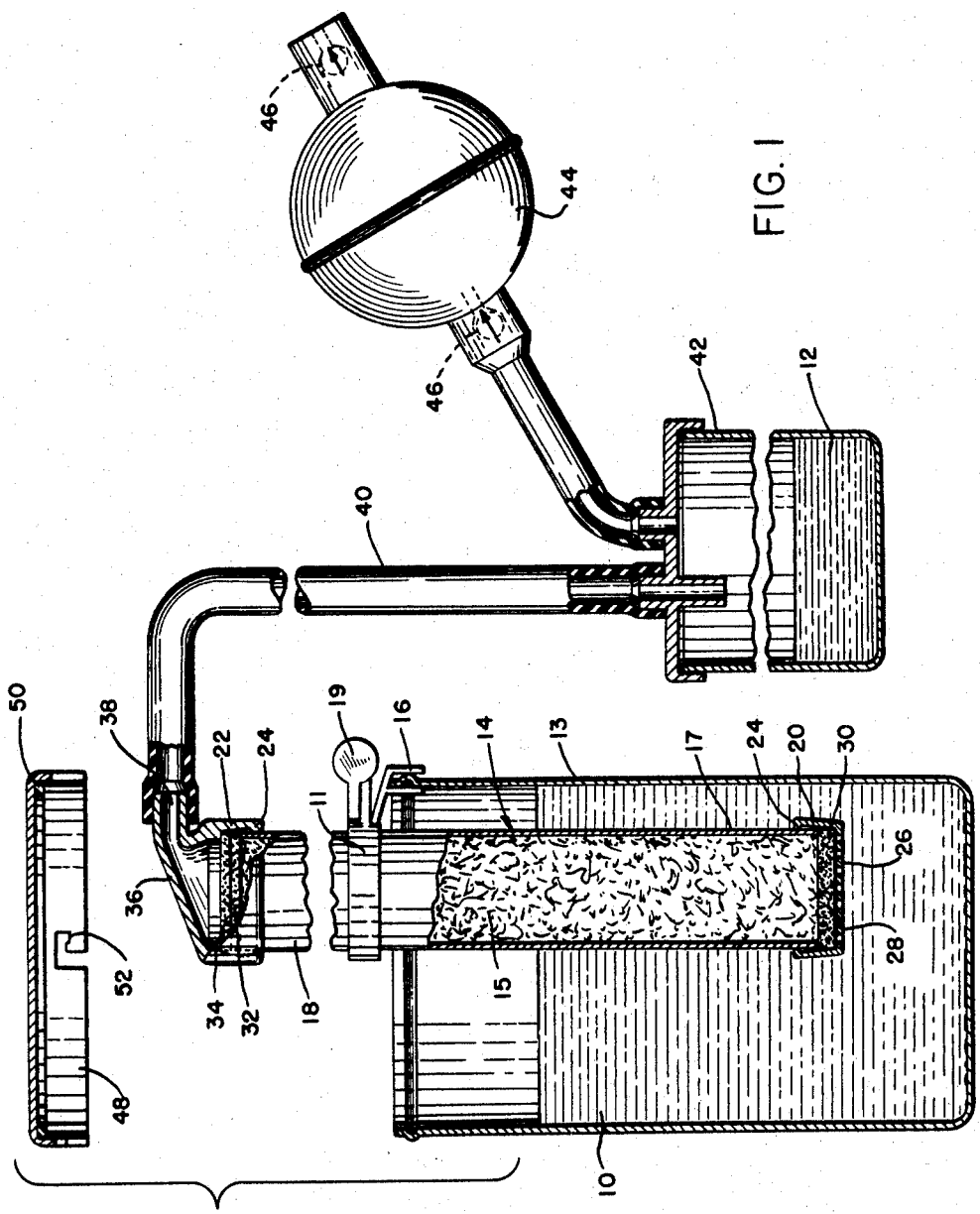

June 18, 1968 P. S. LITT 3,389,079
WATER PURIFICATION BY CAPILLARY DIFFUSION
Filed Oct. 15, 1962 2 Sheets-Sheet 1

INVENTOR.
PETER S. LITT
ATT'Y.

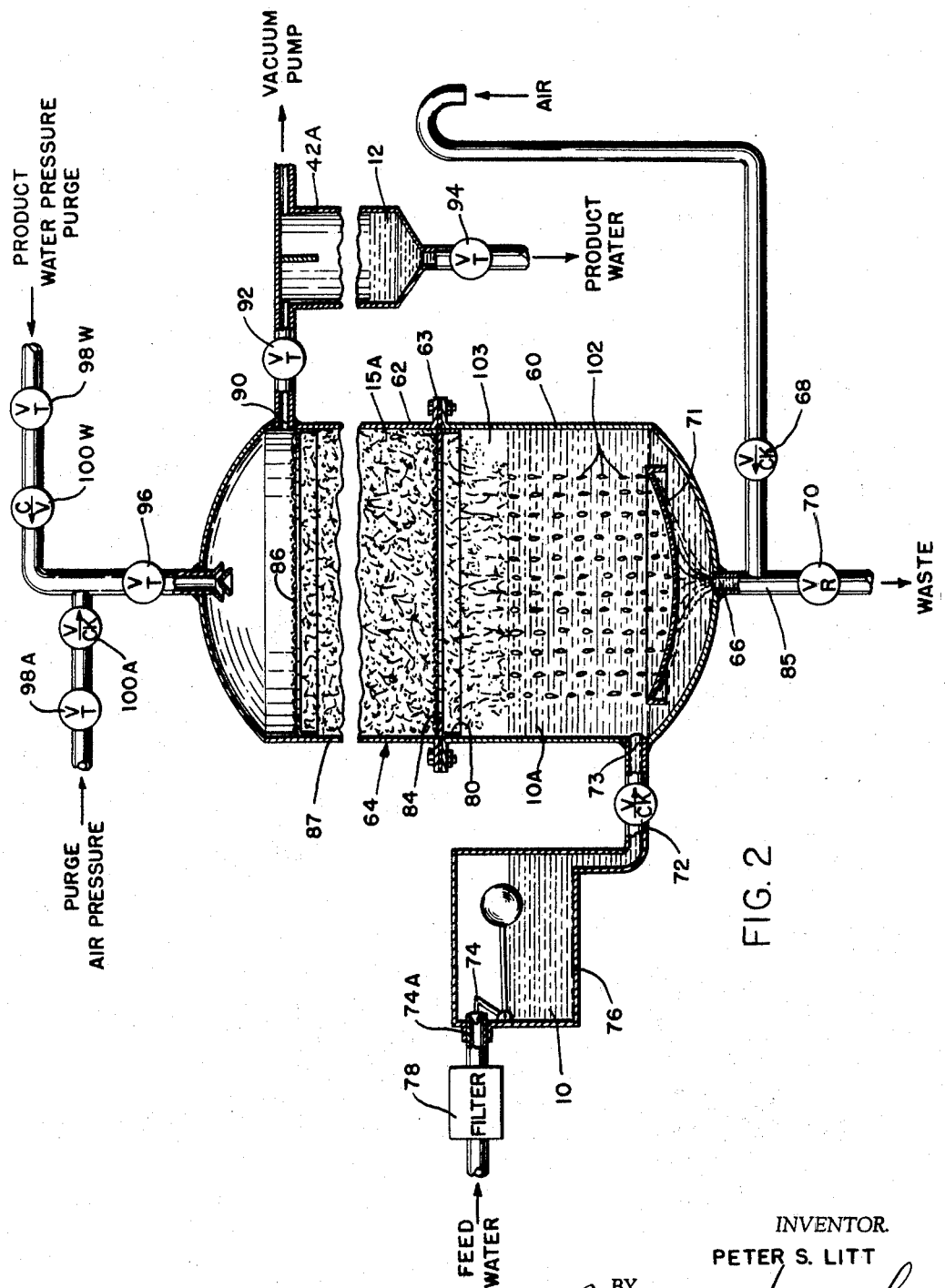

United States Patent Office
3,389,079
Patented June 18, 1968

3,389,079
WATER PURIFICATION BY CAPILLARY
DIFFUSION
Peter S. Litt, Albuquerque, N. Mex., assignor of twelve percent each to Walter B. Hobbs and Watson D. Harbaugh, both of Evanston, and Ralph K. Ball, Kenilworth, Ill.
Continuation-in-part of application Ser. No. 214,217, Aug. 2, 1962. This application Oct. 15, 1962, Ser. No. 233,996
10 Claims. (Cl. 210—32)

This application is a continuation-in-part of my co-pending application Ser. No. 214,217, filed Aug. 2, 1962, and now Patent No. 3,236,768, reference to which is hereby made.

The present invention relates to the method and apparatus for producing fresh water from sewage, brackish, stagnant, industrial wastes, sea and alkaline waters; including water solutions having different specific gravities and different pH readings, ionized and non-ionized.

The principal objects are to provide low cost and high volume methods and devices that reduce the total contaminants present in such waters in single or multi-stage operations, within the range of 50% to 90% per stage; to produce irrigation waters having from 1,000 to 3,500 p.p.m. with a sodium ratio to the total p.p.m. of less than 60% as derived from initial sea water mixtures having approximately 35,000 p.p.m.; to produce drinking waters of less than 250 p.p.m. of inert minerals and soft water of less than 60 p.p.m. (60 p.p.m. being equal to 3.5 (3½) grains hardness) with batch or continuous running equipment of any volume or size.

The invention contemplates: (1) the use of inexpensive and readily available additives, such as calcium hydroxide and calcium sulphate or the like, to control organic particles, including hydrocarbons, that are present in solution in an amount in excess of ionized particles present to attract them, and thereby assist and accelerate the reclamation of both the water and the additives from an organically polluted body of water, which additives are quite safe and are readily detected even in small quantities as a telltale in the product water, if reclamation equipment becomes damaged; (2) controlling the movement of ionically influenced particles of both electrical charges in a body of contaminated water at different rates and speeds than the water molecules therein, and the discrimination of the particles from the water molecules electrically, temporally and spatially for selective removal; (3) reducing all the contaminant particles in feed water to a common denominator of ionization behavior and by capillary diffusion, Brownian movement, weight responsive effects and negative gauge pressures moving pure water from the feed water more rapidly through a capillary lattice than the ionization influenced particles can travel, and by rejecting ions from limited thin portions of the body of water and collecting purified product water therefrom; and (4) reducing a high alkalinity pH (12 to 13) of feed water to a neutral pH (6.5 to 7.5) without need of adding neutralizing reagents, and from a low pH to a neutral pH if desired.

Furthermore, the invention in its operation involves no heat exchange or high vacuum procedure either to freeze or distill the contaminated water; nor high pressures, supersonic energies or heavy use of external energy to stress water molecules; nor corrosion or scaling of equipment, replacement of expensive elements including electro-dialytic membranes, or undesirable residue of toxic materials that confront conventional methods objected to by public health officials.

The invention contemplates deriving a low cost, residue-free product water from any known bodies of contaminated water of useful size with low cost equipment which operates long periods of time without attendance.

Another object of the invention is to free from a body of contaminated water thin films of water for contact with air molecules over large interface surfaces on both sides in the presence of reduced pressure to free water molecules at the surfaces in greater numbers from contact with contaminating ions as a purification step and collecting the films of reduced contamination as product water.

Another object of the invention is to provide a water reclamation system in which ion movement in contaminated water is retarded in the upward movement through a capillary lattice by weight responsive forces, by indiscriminate and random translational movement of the ions and water molecules in the lattice, while the molecular activity is increased and the angular momenta of the water molecules of the solution in the lattice is accelerated predominantly in one direction by the capillary action of the lattice upon the water molecules and by a reduction of pressure upon the water molecules in the lattice.

Another object of the invention is to provide a continuous running high volume, small sized water reclamation system for high quality water in one stage which can employ vapor to backwash or purge the equipment when necessary.

Another object is to conserve or eliminate the use of product waters to purge equipment and thereby induce a greater yield of product water from ion contaminated water.

The invention also provides an apparatus for purifying water whose constructional costs and space requirements are a small fraction of conventional equipment; whose moving parts are few and essentially comprise conventional pumps, motors and automatic control elements; whose external energy requirements in large installations are a small fraction of that required for conventional equipment and little or no energy is required in small volume devices such as survival equipment for families, individuals and travel; and, whose apparatus is made of inexpensive, readily available, corrosion and vermin proof materials, including non-frangible dielectric materials, if desired.

Other objects of the invention will be appreciated from the description of the drawings in which several embodiments of the invention are illustrated schematically for carrying out various phases of the process in which:

FIG. 1 is a diagrammatical view of a batch method and apparatus for purifying water in a single stage for survival or family kits with the utilization of gravity and negative gauge pressures; and FIG. 2 is a diagrammatical view of a method and apparatus showing a modification embodiment of the invention.

For better understanding of the invention, I have noted that all water contaminants, other than heavy or gross solids which can be readily removed by conventional mechanical filters, can be handled according to their ionization behavior in a water solution. Some substances such as organic wastes which include microscopic plant and animal micro-organisms, and both soluble and insoluble hydrocarbons including oils and dyes, do not ionize readily in water while other mineral earth compounds partially soluble in water such as inexpensive calcium compounds including calcium hydroxide $Ca(OH)_2$ and calcium sulphate $CaSO_4$ not only ionize in water adequately in small quantities, but also have an affinity for such organic particles in solution.

In the present invention the use of calcium sulphate is preferred when organic particles are present because it is neutral and does not change the pH of the solution. Under some circumstances, however, as with sea water or for particular product waters, advantages may be derived by changing the pH with addition of controlled amounts of calcium hydroxide so that particular indicators may be used as well as control organic particles. The use of calcium hydroxide even in small amounts will do this.

Otherwise, unless specified, $CaSO_4$ will be referred to herein for purposes of description by way of example and not by way of exclusion of other known ionizing compounds found present in or which may be added to contaminated water for desirable side effects.

$CaSO_4$ is soluble in water up to 2,500 p.p.m. and $Ca(OH)_2$ is soluble up to 1,500 p.p.m. depending upon temperature and altitude. To the extent that a solution is attained the compound is disassociated to form in the solution ion particles $Ca^{++}$ and $SO_4^{--}$. Any $CaSO_4$ present in excess of that which is in solution is not disassociated but remains in suspension without ionization. Where organic materials are present and ion particles are scant, sufficient $CaSO_4$ should be added to provide an ionization effect for all organic particles present. The additive should only be in amount required because its presence is otherwise generally considered to be a contaminant also. Such an additive can be specified for all organic contamination generally experienced including industrial wastes. Then when intimate contact is established between ionized particles and the dissolved organic particles, the response of the organic particles is controlled or influenced by the Brownian movement of the ion particles in the subsequent treatment of the solution by capillary diffusion, air gap diffusion or rejection under negative pressure conditions, electrical polarity attraction and electrostatic repulsion and including selectivity related to electrical charge.

I have found that molecules of water in a solution flow more rapidly through a capillary lattice made of an inert and preferably dielectric material than the ion influenced particles which contaminate the water.

"Lattice" as used herein contemplates a body or mass preferably comprising a felt-like matting of fine elements of an inert dielectric material for which water molecules have an affinity and defining a labyrinth of minute irregular circuitous capillary-like passages and cavities therethrough such as found in fine wool felts through which water molecules are controlled by capillary attraction in their movement between the elements, which may include fine nylon or Dacron reinforcement filaments, and compacted enough not to have any passages of a size therethrough which serve merely as siphon conduits through which water would flow by gravity alone.

The water, having little if any electrical charge and molecularly being electrically neutral has a relative freedom of action in the presence of dielectric materials and easily wets them and freely enters into a capillary action therewith. On the other hand, ions in solution having electrical charges influencing a wide neighboring region of molecules tend to cluster and avoid intimacy with dielectric materials including air spaces when reasonably free to do so. Also, it has been noted that the ions and pure water tend to diffuse in the solution but adjust their proportional relationship at an interface involving contiguous materials of different specific gravities and different electrical characteristics both solid and gaseous. Water molecules are predominant at the interfaces. However, ions having H or OH radicals tend to respond and flow like a water molecule (HOH) and tend to provide an acidic pH reading in the product water.

Thus, when the ion contaminated water endeavors to pass through the capillary lattice, the ions forming their clusters of electrical influence are reluctant to break up or enter the dielectric lattice or be exposed to an interface surface and tend to stay away from the face thereof. Nor can the cluster travel as rapidly as free water molecules in the lattice because with the Brownian movement of the ions and water molecules the surfaces of the dielectric filaments material and the presence of gravitation forces predominantly retards ion movement in the maze of minute irregular capillary passages. The water molecules however are more active under negative gauge pressures and move more rapidly ahead under capillary action with their random movement oriented predominantly in one direction that is opposite to the gravitational forces exerted upon the ions, wetting the capillary passages and outdistancing the ions in their movement. This provides an action I refer to as "capillary diffusion" and although relative distances of travel remain proportional under varying rates of liquid flow for a given capillary lattice including air space diffusion, the flow rate of water molecules is accelerated by negative gauge pressure.

When air under pressure is passed through the capillary lattice to blow it free of liquid it also assists in purging the lattice during and after the solution is jettisoned. An air drying effect occurs in the capillary passages which increases ion concentration in any solution or moisture lingering and thereby tends to cause an ion reassociation which permits a rather quick and thorough physical expulsion of reassociation of particles present in the passageways. Whether this is due in part to reassociation of ions in granular form is not clear because a high degree of air purging occurs with capillary lattice materials that are not readily dried. However, in the event any ions reassociated as particles might become trapped in the capillary lattice and not blow free I have found that vibration of the lattice structure by pulsating the air will shake them out, or a subsequent brief flush of pure water, whether as a mist or in droplets carried through by air pressure, will clear the capillary passages quite well for a repeated step of purification of contaminated water by capillary diffusion.

In applications where small amounts of potable water are desired on the order of a gallon per day, a small refillable container can be employed with a "wick"-like capillary lattice made of materials capable of capillary diffusion such as a body of the materials mentioned. The lattice is sealed from air throughout its length and one open end of the lattice is lowered into a container holding the solution and the other open end is preferably subjected to negative gauge pressure. Then the lattice with its full length will pass pure water against gravity by capillary diffusion and negative pressure ahead of the movement of the ions in the wick.

The recovery of the product water at the top of the lattice can continue until the ions begin to appear. Then the wick can be lifted free, purged or discarded. The container is emptied and refilled with more solution and the purged or new lattice is returned to its working position.

Such a device is shown in FIG. 1 where a survival kit is shown which operates without electricity and only requires personal attention and a negative gauge pressure inducing service. A mess kit container 13 is filled with solution or feed water 10 and a wick-like lattice unit 14 is inserted part way through a clamp ring 11 that is forked as at 16 to be received in supported relationship on the edge of the container and manipulated by squeezing terminal ears 19. As thus supported one end 17 is immersed in the solution 10 and the other end 18 extends above the container 13.

More than one lattice assembly can be used at a time or alternately if desired on the rim of the container 13 if greater production of water is desired in a given time. The quantity of water recovered in a given length of time is proportional to the cross sectional area and inversely proportional to the density of the lattice. The time cycle between purgings is proportional to the length of the lattice.

The lattice unit comprises a cartridge element which includes a plastic tube 18 made preferably of high density polyethylene filled during or after molding with compacted fibrous materials such as white wool to provide the capillary lattice 15 already characterized. Attachable cups 20 and 22 made either of an acrylic or polystyrene close the ends of the tube, each having preferably at their edges inwardly directed bead-like flanges 24 of an inside diameter normally less than the outside diameter of the tube 18 to engage the outside surface of the tube in removable clamping sealed relationship.

The bottom wall 26 is perforated with small openings 28 to permit water to pass therethrough from the container 13 to the lattice 15, and supports a wafer insert 30 between them when desired. The insert is composed of a foraminous material impregnated with or supporting particles of $Ca(OH)_2$ for gradual dissolution into the water passing through the openings 28. It is used essentially when organic contamination may be present in the feed water 10 and such captivates organic particles as already mentioned as well as cooperating with an ion contamination detector which will now be described.

At the upper end of the tube two inserts are preferably provided as held in place by the upper cap 22. These can be made integrally or separately. The lower one 32 provides an activated charcoal filter layer to remove odors and tastes and the upper one 34 is a carbon wafer or portion impregnated with a contamination indicator which when dried onto the carbon will not be dissolved but will change color when contacted with ion particles in the water passing therethrough. The upper cap is transparent so that a change in color can be detected.

The shape of the upper cap as shown provides a boss 36 having an outlet 38 to which a hose 40 is attached leading to an aspirator-type bottle 42 in which a negative gauge pressure is induced by a squeeze bulb pump 44 having its check valves 46 oriented as shown.

All elements described except possibly lattice cartridge elements 14 can be stored in the container when not in use by a closure element 48 as sealed by a gasket 50 to the open end of the container by a bayonet joint 52.

Operation of the bulb 44, induces a negative gauge pressure in the cap 22 to reduce the pressure on the water in the lattice 15 and accelerate molecular activity of the water molecules ahead of ions entering the lattice. Thus, pure water will flow to the collector cup 42 for a period of time before ions begin to appear. When they do, they will change the color of the upper layer 34 and the operation can be stopped. Thereafter the caps can be removed and the lattice 15 either purged or discarded and a new one placed in operation. From a cartridge of well compacted wool 1" in diameter and 12" long 900 cc. of pure water can be extracted in 20 minutes.

In FIG. 2 a power driven high production unit is shown which can be one of many units used in parallel for long periods of time. Each unit can be purged separately when required while others are operating to maintain continuous service.

Two half shells, 60 and 62, having mating radial flanges 63 are bolted together to form a tank 64. The lower shell 60 has an opening 66 in the bottom thereof connected through a T-fitting 85 and check valve 68 to the atmosphere to permit air to flow into the tank under negative gauge pressure present in the tank. A foraminated air inlet diffusion wall 71 is supported over the opening 66. The tank may be drained through the T-fitting and a pressure relief valve 70 to waste under positive gauge pressure present in the tank.

The tank is supplied with feed water through a check valve 72 and opening 73 and is normally kept at a predetermined level by a float valve 74 in a supply tank 76. Preferably, a mechanical filter 78 is provided upstream to assure the removal of any solids before the feed water enters the system.

Spaced radial inwardly extending flanges in the tank are provided, one 80 on the lower shell 60 and the other near the top of the upper shell 62 to hold between them a capillary lattice 15a as supported in compacted relationship between lower and upper foraminated plates 84 and 86, respectively. Thus, fluid can pass in either direction through the plates and lattice depending upon the direction of differential pressure. A coating 87 of soft insoluble inert material is provided between the wall of the shell 62 and the lattice 15a to prevent channelling of fluid along the smooth wall surface.

Level with the upper plate 86 is an outlet 90 which opens through a throttle valve 92 to a collector 42a that is subjected to negative gauge pressure by a vacuum pump (not shown). Product water 12 is evacuated from the collector at intervals through a throttle valve 94.

At the top of the upper shell 62 product water and air under pressure can be injected into the tank separately or simultaneously through the throttle valve 96 as controlled by throttle valves 98A and 98W and as protected against back flow by check valves 100A and 100W for either Air or Water separately.

In operation, the waste valve 70 is closed and feed water fills the tank to within an inch or two of the lower plate 84. The vacuum valve 92 is opened and a negative gauge pressure is induced above the upper plate 86 which becomes effective through the lattice 15a to the body of feed water 10a. Air then begins to flow into the tank through opening 66 below the diffusion plate 71 and bubble up through the body of feed water 10a.

The air bubbles 102 boil the feed water at its surface and causes surface portions of water to move upwardly through the space 103 in thin films with air in contact with both surfaces of the films under negative gauge pressures. The thinness of the film and double surface exposure to air reduce the number of ion clusters supportable by a given number of water molecules in the film and the thin upper portions of the bubbles are drawn or burst into contact and deposit water of reduced concentration upon the lower plate 84 to be immediately drawn into and through the filter along with moist air.

In the lattice the ionic activity not being materially affected in their Brownian movement by vacuum or capillary action of the lattice and being responsive to gravity-like forces have difficulty in advancing upwardly while air and water molecules whose activity is accelerated by capillary action and vacuum not only have their molecular activity increased by their angular momenta in the lattice is accelerated predominantly in upward direction by both the capillary action and the negative gauge pressure present in the lattice. This increases the yield of product water.

In the event it is desired that air space 103 itself shall be used for rejection of ions, it is not necessary that the level of the water be high enough for the bubbles to touch the lattice. The air in contact with the feed water as assisted by negative pressure will convey water molecules to the lattice 15a and thereafter the lattice serves as a condenser or collector and product water will flow therefrom, but at a lesser rate. However, the operational flow can be substantially continuous since purgings are seldom required.

Where the bubbles do contact the lattice, the lattice can be purged of ions regularly and quickly. The vacuum valve 92 is shut and the purging valve 96 and the air valve 98A are opened. Air will flow under pressure downwardly through the lattice, slowly at first as the lower shell 60 is emptied of water to waste and then rapidly to jettison liquid therefrom including ions in solution therewith. As moisture is reduced in the lattice some ions will reassociate and be blown clear by the air as atomic particles. This greatly reduces the presence of residual ions in the lattice and a short injection burst of product water through valve 98W into the air stream will pick up most of these from the lattice. Thereupon the apparatus can be returned to operation by closing valve 96 and again opening valve 92.

It is desirable that the air bubbles be spread by the diffusion screen evenly over the surface of the water for maximum yield. Once this is established with any induced flow desired with a setting of the vacuum pump the level of the water is adjusted by a horizontal adjustment of the float valve port 74a until the top of the bubbles contact the grid 84. It will be found that the distance between the water level and the grid 84 will be between ½ and 1½ inches for best results. A 1" spacing and a lattice having a diameter of 6" and a thickness of 4" will produce approximately 250 ml. of product water per minute. Five to six gallons of product water can be recovered between purgings. Under these circumstances it is desirable to use about a pint of product water in the purging cycle. The vacuum at outlet 90 is adjusted so that flow of air through the tank will cause the bubbles to touch the grid. Negative gauge working pressure will range from 1 to 5 lbs. and the positive gauge purging pressure is approximately 15 p.s.i.

Two or more of the devices described in connection with FIG. 2 can be connected in parallel so that the tank can continue to operate while one is being purged as described. In the design of a unit the diameter of the lattice can be for greater yield increased and the thickness of the lattice can be increased for a greater time between purgings.

In some respects we are not able to account fully for the improved results which are obtained by the method and apparatus of this invention, and it should be understood that any attempt to analyze the theory which is believed to be responsible for these results is to be construed not as defining a mode of operation, but merely as a possible explanation of certain physical, electrical, or chemical phenomena which have been observed.

Having thus described the invention and various embodiments thereof it will be appreciated by those skilled in the art how the objects and operation of the invention set forth herein are fulfilled and accomplishd and how various and further embodiments and modifications can be made including by reference, those of my co-filed applications, Ser. Nos. 194,135, filed May 11, 1962 and now abandoned, 198,355, filed May 28, 1962 and now Patent No. 3,266,630, and 214,217 filed Aug. 2, 1962 and now Patent No. 3,236,768, without departing from the spirit of the invention, the scope of which is commensurate with the appended claims.

What is claimed is:

1. The process of reclaiming water from a feed water solution of ionic content comprising:
   conducting feed water films as feed water mists into contact with a capillary diffusion lattice,
   collecting the feed water of the mists in the capillary lattice,
   conducting the collected feed water through the lattice to retard the flow of ions through said passages by capillary diffusion while urging the water molecules to flow freely through said capillary passages under the influence of capillary action.

2. The process of purifying feed water contaminated with ionic particles comprising:
   forming thin films of feed water mists,
   conducting the thin films into contact with and through a labyrinth of minute capillary passages present in a diffusion lattice,
   retarding the movement of the ion particles in said labyrinth of minute capillary passages, and
   withdrawing water molecules from the lattice ahead of the ion particles retarded in their movement.

3. The process of reclaiming product water from a feed water solution of ionic content consisting of conducting feed water films as feed water mists in moist air into contact with a capillary diffusion lattice,
   collecting the feed water mists in the lattice and conducting the collected water through the lattice to retard the flow of ions therethrough while urging the water molecules to flow freely through the lattice under negative gauge pressure.

4. The process of reclaiming water from a feed water solution of ion content comprising:
   flowing air in contact with a surface of the feed water to pick up and carry water molecules from the feed water,
   passing said air through a capillary lattice to collect said water molecules carried by the air, and
   removing from the capillary lattice as product water the molecules of water collected in the capillary lattice.

5. The process of reclaiming water from a feed water solution of ion content comprising:
   bubbling the upper surface of a body of feed water with air to form thin films of feed water of reduced ion content in contact with air on both sides of the films,
   collecting the thin films of feed water in a capillary lattice along with the air,
   conducting said collected feed water and air through the capillary lattice under capillary action and negative gauge pressure in the capillary lattice,
   retarding the movement of ion particles by their random movement in the capillary lattice, and
   withdrawing water molecules from the lattice ahead of the ion particles.

6. The process of purifying feed water contaminated with ionic particles comprising:
   forming bubbles of feed water to moisten air at approximately zero gauge pressure,
   conducting the moistened air into contact with and through a labyrinth of minute passages present in a capillary diffusion lattice,
   retarding the movement of the ion particles in the labyrinth by the capillary action in the lattice, and
   withdrawing product water molecules from the diffusion lattice ahead of the ion particles retarded in their movement, in the presence of negative gauge pressure.

7. An apparatus for the purification of feed water comprising:
   a container having a body of the feed water in it,
   a capillary diffusion lattice spaced from said body of water and having a portion above said body of water,
   means for subjecting said diffusion lattice to negative gauge pressure,
   means for passing air through the body of water to form a vapor moistened with feed water above said body of water and contacting a portion of said diffusion lattice, and
   means for collecting product water from another portion of the diffusion lattice,
   said diffusion lattice defining a compressible labyrinth of minute irregular circuitous passages capable of moving water molecules by diffusion faster than ions can travel therethrough.

8. An apparatus for the purification of feed water contaminated with ions comprising:
   a container having a body of the feed water in it,
   capillary lattice means spaced from said body and having a portion above said body of water,
   means for subjecting said lattice to negative gauge pressure,
   means for supplying the body of water with air to form thin films of feed water above said body of water and touching said portion of the lattice, and
   means for collecting product water from another portion of the lattice,
   said capillary lattice defining a labyrinth of minute irregular circuitous capillary-like passages capable of moving water molecules by capillary diffusion faster than ions can travel therethrough.

9. An apparatus for reclaiming feed water from a feed water solution of ion content comprising:
   a container having a body of feed water in it,
   an elongated capillary lattice exposed at both end portions,
   means for sealing the capillary lattice from atmosphere over its remaining surface portions,
   means connected to one end portion for subjecting said capillary lattice to negative gauge pressure including an element for collecting water that has passed through the capillary lattice, means in communication with the other end portion for supplying feed water thereto from said body of feed water including an air space between said capillary lattice and body of feed water, and means for supplying air to said space in contact with surface portions of said body of feed water.

10. An apparatus for reclaiming potable water from feed water mixtures or solutions comprising:

a container for feed water, said container sealed from the atmosphere, an elongated capillary diffusion lattice sealed from the atmosphere, means for compacting said diffusion lattice, said diffusion lattice being positioned in said container above the level of the feed water, a chamber and an outlet therein above said diffusion lattice, a collector, a conduit between said collector and outlet, vacuum means for inducing negative gauge pressure in said chamber and diffusion lattice to withdraw water molecules at an accelerated rate, means for admitting a restricted quantity of air below and into said feed water to bubble feed water into contact with said diffusion lattice, and means for admitting air under pressure to said chamber.

References Cited
UNITED STATES PATENTS

| 3,236,768 | 2/1966 | Litt | 210—23 |
| 3,266,630 | 8/1966 | Litt | 210—394 |

OTHER REFERENCES

"Capillary Diffusion," 1960, Saline Water Conversion Report, by the Office of Saline Water, U.S. Dept. of the Interior, January 1961, pp. 37–38.

REUBEN FRIEDMAN, *Primary Examiner.*

MORRIS O. WOLK, E. G. WHITBY, W. S. BRADBURY, *Examiners.*